United States Patent [19]

Yamamoto

[11] Patent Number: 5,145,301

[45] Date of Patent: Sep. 8, 1992

[54] NAIL SUSTAINER

[76] Inventor: Akio Yamamoto, 1602-banchi, Keiden, Fukui-shi, Fukui-ken, Japan

[21] Appl. No.: 653,325

[22] Filed: Feb. 11, 1991

[51] Int. Cl.5 .................. F16B 39/02; F16B 13/06
[52] U.S. Cl. ................................ 411/82; 411/60; 411/72; 411/508
[58] Field of Search .............. 44/82, 258, 60, 23, 44/57, 908, 43, 64, 71, 72, 512, 70, 508, 509, 54

[56] References Cited

U.S. PATENT DOCUMENTS

| | | | |
|---|---|---|---|
| 2,601,803 | 7/1952 | Newman | 411/57 |
| 3,199,398 | 8/1965 | Weisz | 411/57 |
| 3,308,585 | 3/1967 | Fischer | 411/23 X |
| 3,911,781 | 10/1975 | Bappert | 411/386 X |
| 4,094,490 | 6/1978 | Einhorn | 411/60 X |
| 4,708,552 | 11/1987 | Bustos et al. | 411/60 |
| 4,826,373 | 5/1989 | Nakano | 411/82 |
| 4,893,974 | 1/1990 | Fischer et al. | 411/82 |
| 4,915,343 | 4/1990 | Terlecke | 411/908 X |
| 5,007,780 | 4/1991 | Hoffmann et al. | 411/82 |

FOREIGN PATENT DOCUMENTS

| | | | |
|---|---|---|---|
| 1163277 | 2/1964 | Fed. Rep. of Germany | 411/72 |
| 1450909 | 4/1969 | Fed. Rep. of Germany | 411/60 |
| 3031047 | 3/1982 | Fed. Rep. of Germany | 411/71 |
| 72483 | 12/1983 | Fed. Rep. of Germany | 411/72 |
| 3501676 | 8/1985 | Fed. Rep. of Germany | 411/82 |
| 3733621 | 4/1989 | Fed. Rep. of Germany | 411/82 |
| 1186185 | 8/1959 | France | 411/60 |
| 600179 | 6/1978 | Switzerland | 411/60 |
| 1268834 | 11/1986 | U.S.S.R. | 411/82 |
| 1051643 | 12/1966 | United Kingdom | 411/60 |
| 1425852 | 2/1976 | United Kingdom | 411/54 |

Primary Examiner—Rodney M. Lindsey
Attorney, Agent, or Firm—Edwin E. Greigg; Ronald E. Greigg

[57] ABSTRACT

The nail sustainer of this invention is used to be inserted into a hole formed with a board such as a plaster board, a veneer or a plywood which has poor sustaining force against a nail. The nail sustainer comprises tube means for nail insertion, at least one flow opening for an adhesive agent formed with said tube means, splitting portions formed with said tube means along substantially whole the length of the tube means, and at least one ring-like projection formed to project from a peripheral portion of said tube means.

12 Claims, 10 Drawing Sheets

NAIL SUSTAINER

BACKGROUND OF THE INVENTION

1. Field of the Invention

The present invention relates to a nail sustainer which is superior in handling same and which is able to provide a strong supporting portion, by screwing or driving of nails, with a plaster board or a veneer which is relatively thin (for instance about 3 mm thick), or plywoods which are weak in sustaining nails.

2. Description of the Prior Art

It has been practically experienced that where a relatively heavy article such as a frame or a blackboard, is hung on a nail or nails which are driven or screwed into a wall made of for instance a plaster board or a veneer which is relatively thin, the nails become loose soon since such a plaster board or veneer is weak in sustaining nails and therefore the nails cannot function sufficiently.

Accordingly, the wall is knocked to hear variation of sounds so that it may find out where wall substrate members having strong nail sustaining force are positioned, and then the the nails are driven into the wall substrate members. This means that the positions of the nails to be driven are limited due to the positions of the wall substrate members and therefore the article cannot be hung on a desired position.

A plaster board or a veneer is weak in sustaining a nail. It is a cause that the interior of such a board or panel is not formed to be a fine texture and that the interior surface of a hole formed by driving of a nail, is rough so as not to fit the nail. Additionally, where a load acts on the nail which is driven into the board, it accelerates to easily break the interior of the board around the nail hole which has been once broken partially by driving of the nail. With the reasons such a board is weak in sustaining the nails.

The inventor has researched in view of the problems raised in the prior art and obtained the following knowledges.

If the peripheral portion around a hole of a board formed by screwing or driving of a nail is firmed with an adhesive agent so as to avoid a break of the hole, and if the nail is sustained by a nail sustainer which is inserted into the hole and adhered thereto and fixed, the nail may be attached strongly to a desired position on the board.

SUMMARY OF THE INVENTION

The present invention has an object to provide a nail sustainer for increasing nail sustaining force of boards which are weak in sustaining nails by developing the above-mentioned knowledges properly.

In the present invention, the nail sustainer which is used to be inserted into a hole formed with a board such as a plaster board, a veneer or a plywood which has poor sustaining force against a nail, comprises tube means for nail insertion constructed to be inserted into the hole of the board, and having a chamber which opens at the base end portion thereof, at least one flow opening for an adhesive agent formed with at least a portion on the side of the base end portion of said tube means to face an inner surface portion of the hole and to communicate with the chamber said tube means, splitting portions formed with said tube means along substantially whole the length of the tube means, and at least one ring-like projection formed to project from a peripheral portion of said tube means forwardly of the flow opening to surround the periphery of said tube means, said ring-like projection having an outer edge portion which may be contacted with the inner surface portion of the hole.

Accordingly, the present invention has the following advantages.

(1) When the nail sustainer is inserted into the hole formed with a board which is weak in sustaining a nail, it becomes in such a state that the flow opening for an adhesive agent is faced to the inner surface portion of the hole and that the ring-like space is formed by means of the ring-like projection which may be in contact with the inner surface portion of the hole.

Therefore, the liquid adhesive agent flown from the flow opening and the split portions may be effectively guided or introduced in the ring-like space and the liquid adhesive agent may permeate the inner surface portion of the hole evenly.

Accordingly, it becomes possible to easily improve the inner surface portion of the hole to have a fine texture which is substantially in a state of equality, so as to strongly adhere and fix the nail sunstainer and the improved portion to each other integrally. Additionally, the nail or the screw nail sunstained by the nail sustainer may tightly be held by the inner surface portion of the tube of the nail sustainer.

As is clear from the fact, even if a plaster board, a relatively thin veneer and a plywood, which are weak in sustaining a nail, are used for hanging relatively heavy articles such as a frame, a blackboard or remarkably heavy articles such as a shelf, the hanging parts for supporting such articles may be fixed stably at a desired position on the board by means of the nails which are sustained by the nail sustainers.

(2) Where a tapered opening is formed with the base portion of the tube, the opening end of the base portion of the tube becomes in a closed state by pressing a supplying nozzle of an adhesive agent supplier on the tapered opening and it may prevent the supplying nozzle from deeply inserting into the tube.

Therefore, the liquid adhesive agent supplied by the supplying nozzle may be smoothly flown from the flow opening without providing any particular means with the adhesive agent supplier.

(3) Where the ring-like projection is formed respectively in a shape of a disc having flexibility, when the nail sustainer is inserted into the hole formed with the board, the ring-like projection is curved and deformed in contact with the inner surface portion of the hole and it may almost prevent the adhesive agent from flowing out from the contacting portions between the ring-like projections and the inner surface portion of the hole. Further, where the nail is screwed into the tube of the nail sustainer, the ring-like projection may be easily curved and deformed according to expansion of the tube.

Other objects and advantages of this invention will be apparent from the detailed description of the embodiments with reference to the accompanying drawings.

BREIF DESCRIPTION OF THE DRAWINGS

The drawings show embodiments of a nail sustainer according to the present invention in which.

DETAILED DESCRIPTION OF THE EMBODIMENTS

Figure 1:
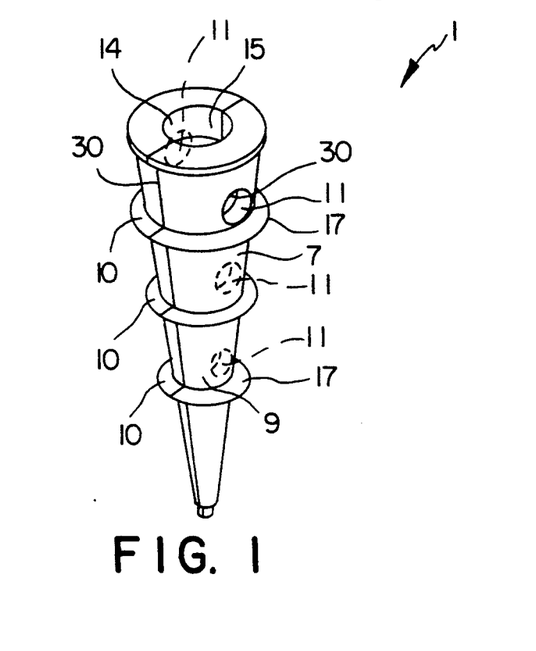
FIG. 1 is a perspective view of the nail sustainer.
Figure 2:
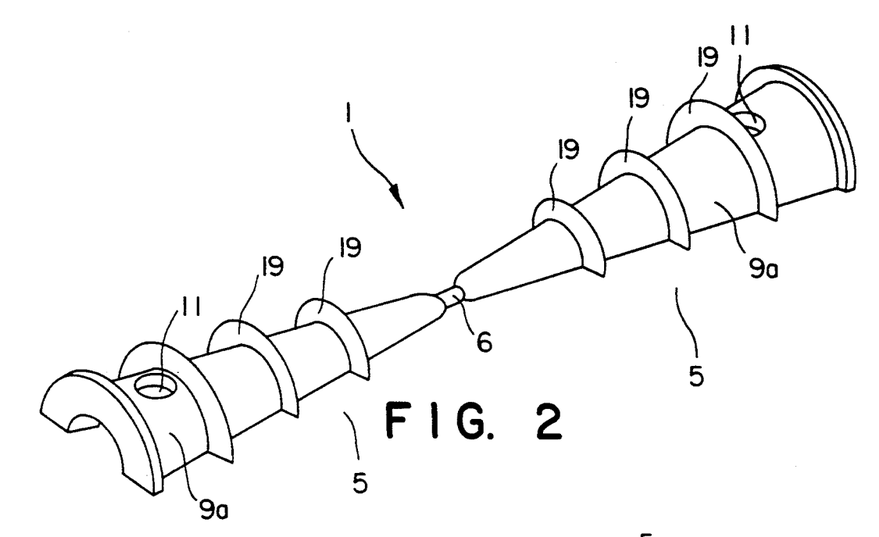
FIGS. 2 and 3 are perspective views each showing a pair of half divided portions which are connected to each other at the forward ends thereof to be bendable.
Figure 3:
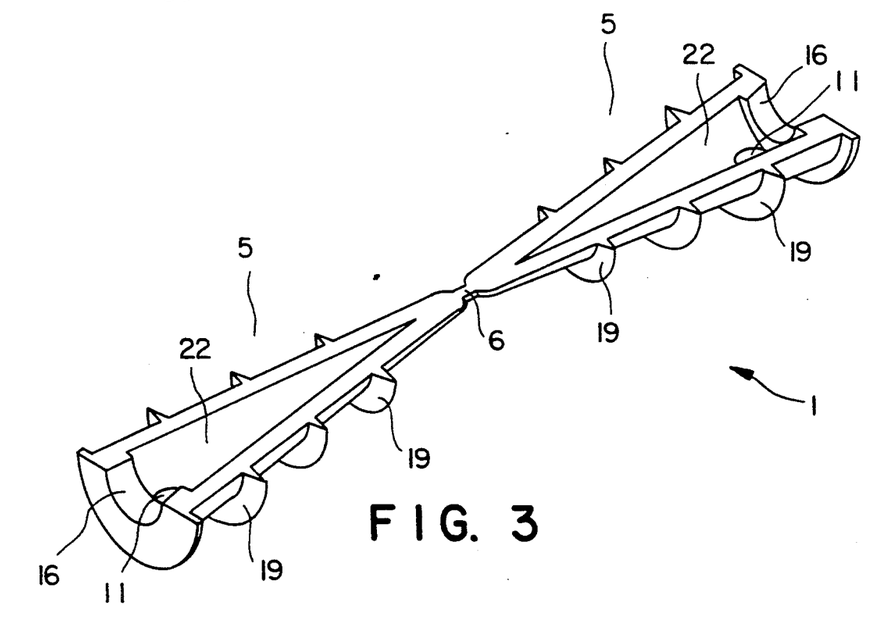

As shown in FIGS. 1 through 3, a nail sustainer 1 according to the present invention is used to be inserted and fixed to a hole 3 (See FIG. 4) formed with a panel or board 2, which has poor sustaining or holding force against a nail, such as a plaster board, a veneer having relatively thin thickness and a plywood. The nail sustainer 1 is, for instance, made of plastics to form an integral body.

The nail sustainer 1 comprises a pair of divided half portions 5 and 5 and these divided half portions 5 and 5 are connected to each other at the forward ends thereof by means of a bendable portion 6. By fitting these divided half portions 5 and 5 together, a nail inserting tube 7 is formed substantially in a conical shape. Further, a plurality of ring-like projections 10 in a shape of disc having flexibility, are formed with the a periphery 9 of the tube 7 to project therefrom. In this embodiment, considering increase of nail sustaining force by avoiding damage to the hole 3 (Where the board 2 is, for instance, a plaster board, a part of the hole 3 is broken.) due to insertion of the ring-like projections 10 when the nail sustainer 1 is inserted in the hole, or considering easyness of insertion of the nail sustainer 1 to the hole 3, the diameter of the ring-like projections 10 are made to be smaller as it is close to a forward end of the tube 7.

The divided half portions 5 and 5 are made to be uniform and they are formed to be a gutter which is slender toward a forward end of thereof and forms a semicircle in cross section, and a flow opening 11 for flowing out an adhesive agent is formed with the base portions of the divided half portions. A semicircular projecting portion 16 is formed to project respectively from each of the base portions of inner surface portions of the divided half portions 5 and 5. The semicircular projecting portion 16 is provided for forming a tapered hole 15 which may tightly contact a periphery portion 13 of a supplying nozzle 12 of an adhesive agent supplier. The tapered hole 15 is made by ring-like projecting portions 14, which become slightly small in diameter toward a forward end of the tube, in a state of fitting of the divided half portions 5 and 5.

Further, the flow opening 11 is formed in communication with a forward end of the semicircular projecting portion 16. A ring-like projection 10 is formed with each of outer surface portions 9a and 9a of the divided half portions 5 and 5 respectively to be placed at a forward portion from the flow opening 11 in such a state that the ring-like projection 10 surrounds the periphery of the tube 7. The ring-like projection 10 comprises two semicircle thin guards or flanges 19 having flexibility, which are arranged on the tube leaving a suitable interval or distance therebetween, and the thin flanges 19 are formed to have a thin peripheral edge 17 respectively. The peripheral edge 17 or substantially whole the ring-like projection 10 is constructed to be in contact with the inner surface portion 3a of the hole 3 in such a state that they are curved or bent.

Next, examples of the usage of the above mentioned nail sustainer 1 will be described.

FIRST EXAMPLE OF USAGE

FIGS. 4 through 9 show a manner of usage of the nail sustainer 1 together with its function wherein the nail sustainer 1 is attached to a board 2 as a plaster board 2a for sustaining or holding, for instance, a nail 20 as a screw hook 20a therein. The nail sustainer 1 comprises a pair of divided half portions 5 and 5 which are fit together in such a state that each of grooves 22 and 22 of the divided half portions 5 and 5 are faced to each other.

Figure 4:
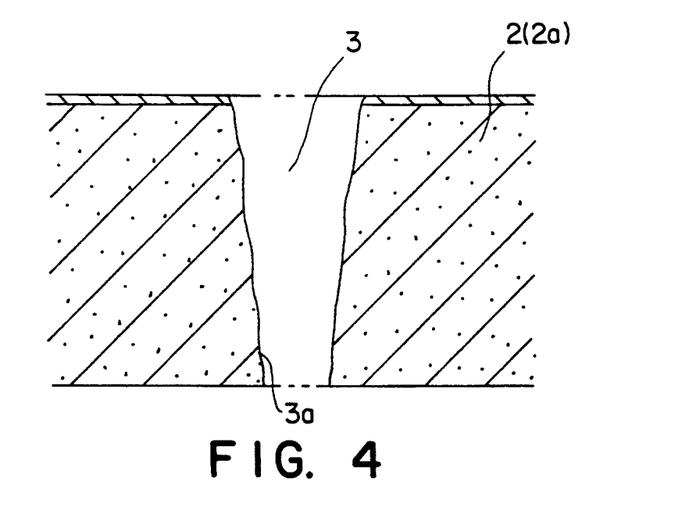
FIG. 4 is a sectional view of a plaster board with a hole.

As shown in FIG. 4, a hole 3 is formed with the plaster board 2a by driving a screw portion 21 of the screw hook 20a into the plaster board 2a at a desired position and then by removing the screw hook 20a therefrom.

Figure 5:
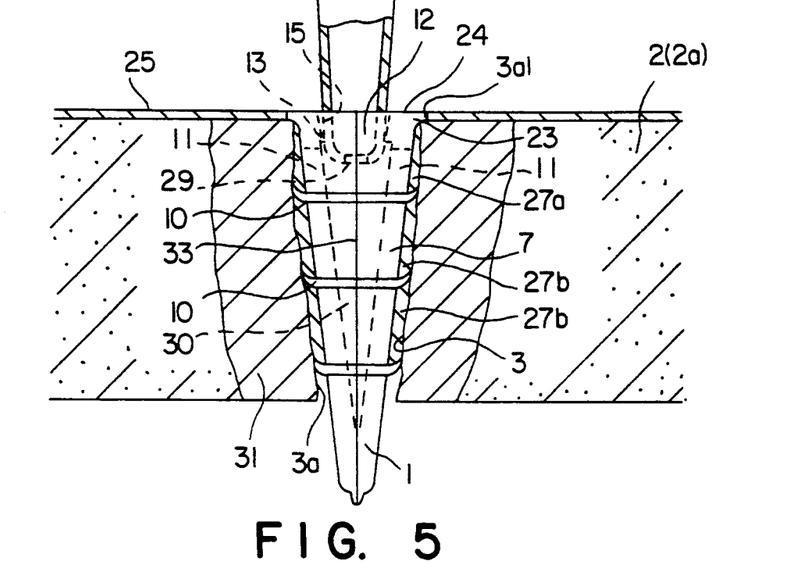
FIG. 5 is a sectional view of the board with the hole in which the nail sustainer is inserted and an adhesive agent supplier is set.
Figure 6:
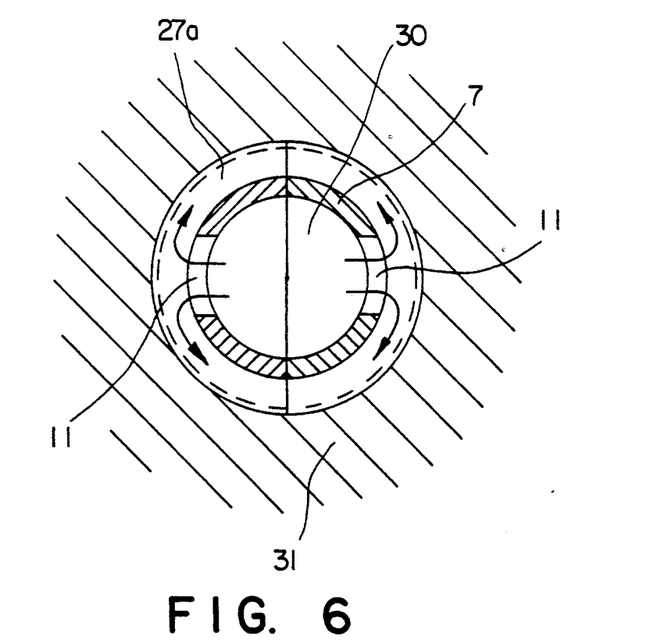
FIG. 6 is a cross sectional view of the board with the hole in which the nail sustainer is inserted, and showing the flow of the adhesive agent.

Thereafter, the nail sustainer 1 is inserted in the hole 3 by hammering while the ring-like projections 10 are bent and deformed. At the time a base peripheral edge 23 of the tube 7 contacts a base inner peripheral portion 3a1 of the hole 3 and an end surface 24 of the tube 7 is set to be substantially even or plane with respect to a board surface of the plaster board 2a. As shown in FIGS. 5 and 6, a ring-like space portion 27a is formed to surround a base end peripheral surface portion of the tube 7 and ring-like space portions 27b are formed between the ring-like projections 10 adjacent one another.

Thereafter, as shown in FIG. 5, a supplying nozzle 12 of a liquid adhesive agent supplier is pushed to a tapered hole portion 15 of the tube 7 to close an opening end of the tube 7. With this setting of the liquid adhesive agent supplier the tapered hole portion 15 may prevent the unnecessary insertion of the supplying nozzle 12 so as to avoid such a state that a flow opening 11 of the tube 7 is closed by the supplying nozzle 12. When a liquid adhesive agent is supplied to the tube 7 through an opening 29 of the supplying nozzle 12, the liquid adhesive agent is flown into the ring-like space portion 27 after a chamber 30 of the tube 7 is filled therewith, as shown in FIG. 6. After filling the ring-like space portion 27a, the liquid adhesive agent is permeating a peripheral portion 31 of the hole 3 evenly.

Figure 7:
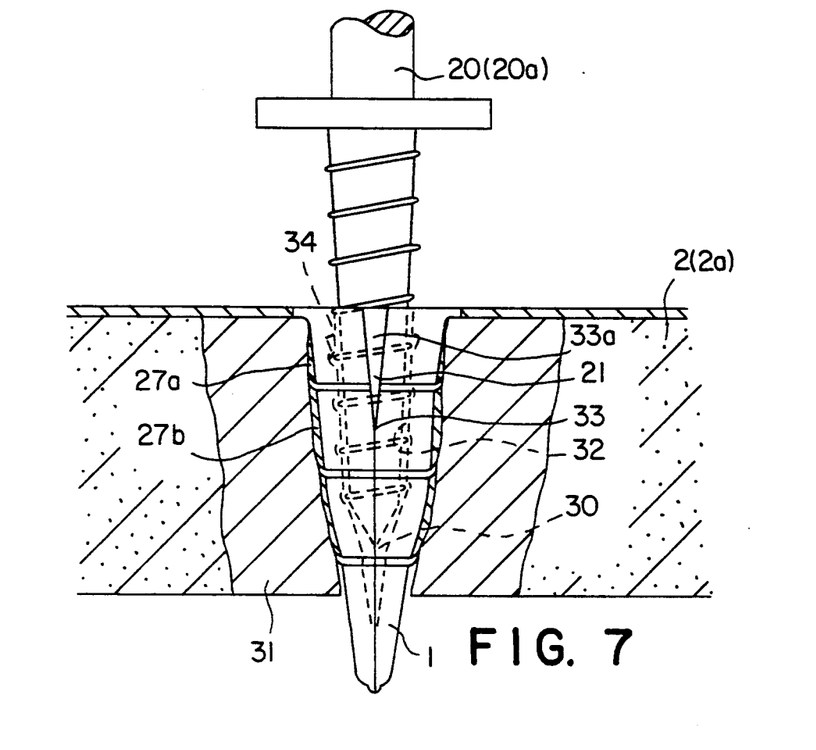
FIG. 7 is a sectional view of the board with the hole wherein a screw nail as a screw hook is driving into the nail sustainer.
Figure 8:
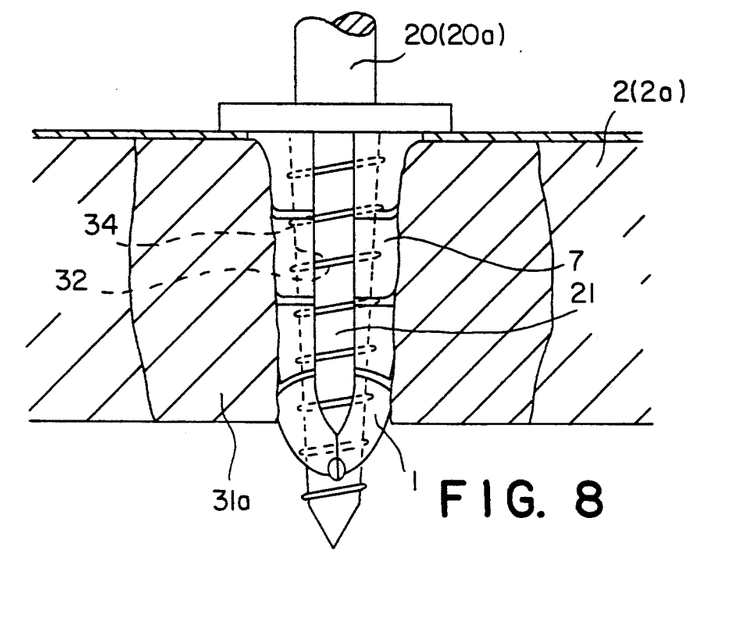
FIG. 8 is a sectional view of the board with the hole wherein the screw nail expands the nail sustainer.

As shown in FIGS. 7 and 8, the screwed portion 21 of the screw hook 20a is driven into a chamber inner portion 32 of the tube 7 immediately after supplying a predetermined amount of the adhesive agent. According to driving of the screw hook 20a, splitting portions 33 of the divided half portions 5 and 5 are opened gradually so that the liquid adhesive agent remaining in the chamber 30 may be flown into the ring-like space portions 27a and 27b through the splitting portions 33 and may permeate the peripheral portion 31 of the hole 3.

After hardening of the adhesive agent, the peripheral portion 31 of the hole 3 is improved to have a fine texture and the nail sustainer 1 tightly fits the improved portion 31a and becomes integral therewith.

Figure 9:
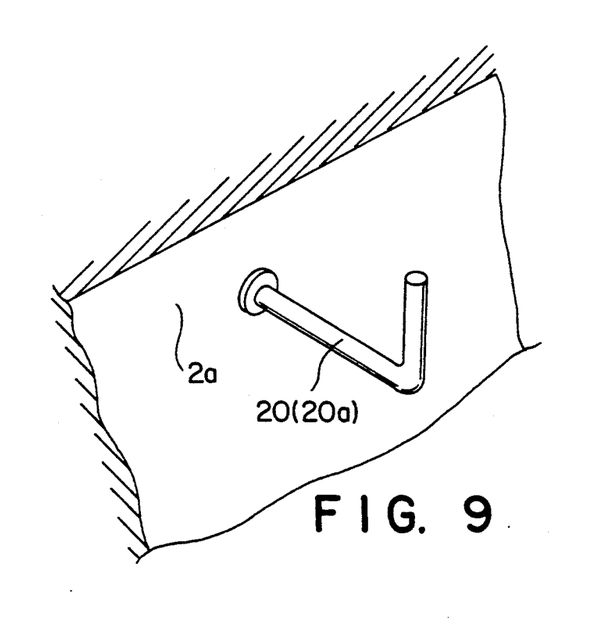
FIG. 9 is a perspective view showing a state of attaching the screw hook to the plaster board.

Further, the screw hook 20a is fixed to the plaster board 2a strongly, as shown in FIG. 9, since the screwed portion 21 of the screw hook 20a is driven into the chamber inner portion 32 of fine texture while forming a screw groove 34 with the chamber inner portion 32 and the screwed portion 21 and the tube 7 are tightly fit and integral with each other.

Accordingly, even if the article to be hung is remarkably heavy, it may be hung while keeping a stable condition.

SECOND EXAMPLE OF USAGE

Figure 10:
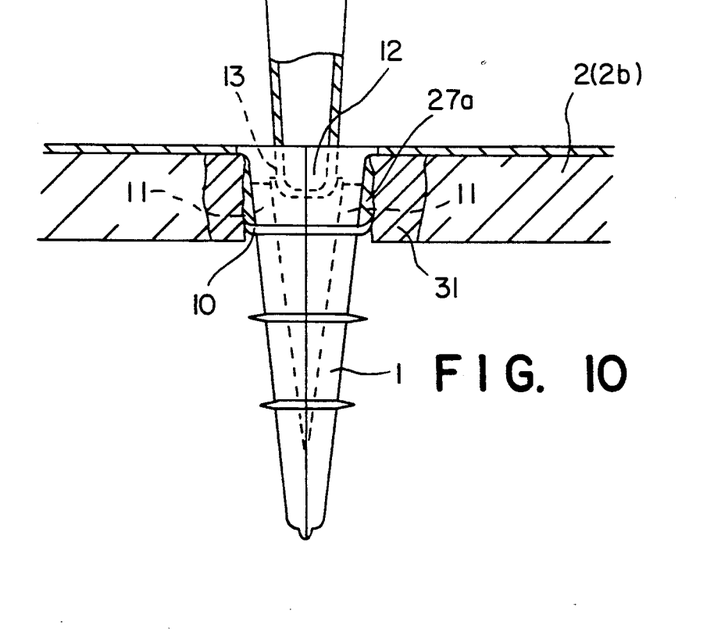
FIG. 10 is a sectional view of a veneer with the hole in which the nail sustainer is inserted and an adhesive agent supplier is set.
Figure 11:
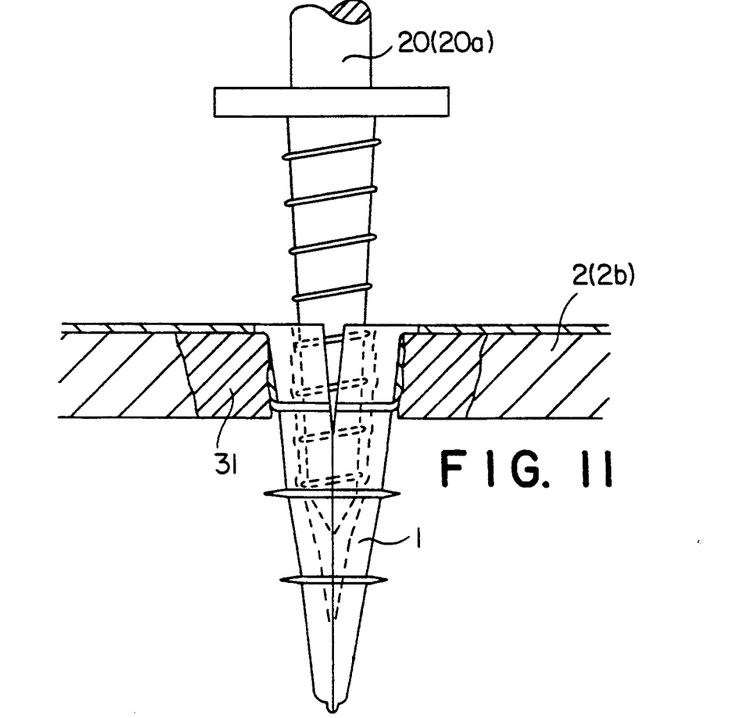
FIG. 11 is a sectional view of the veneer with the hole wherein a screw nail as a screw hook is driving into the nail sustainer.
Figure 12:
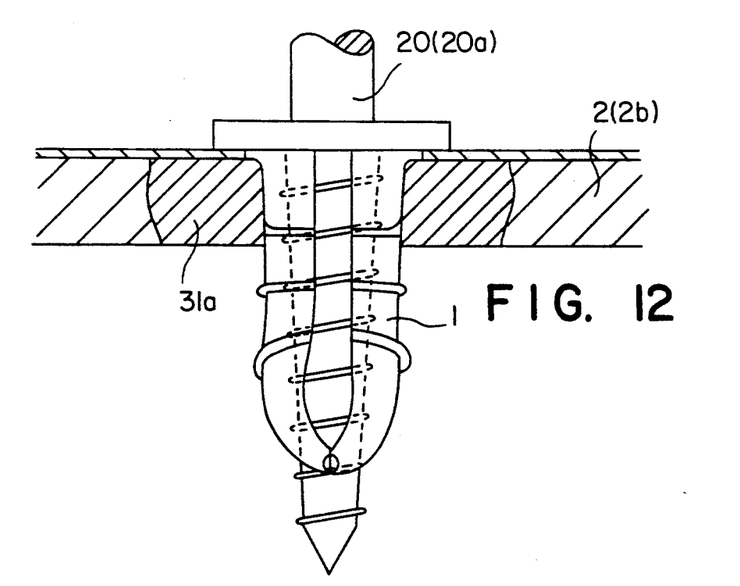
FIG. 12 is a sectional view of the veneer with the hole wherein the screw nail expands the nail sustainer.

FIGS. 10 through 12 show a manner of usage of the nail sustainer 1 which is attached to the board 2 as a veneer 2b having a relatively thin thickness (for instance about 3 mm thick) and the nail as a screw hook 2a is sustained or held by the nail sustainer 1 with substantially the same manner as the first example of usage.

In the figures, it is shown that the ring-like space portion 27a is formed on the side of the base end of the tube 7 since the veneer 2b is relatively thin. Further, permeation of the adhesive agent into the peripheral portion 31 of the hole 3 may be carried out by the same process as the first example of usage. With hardening of the adhesive agent the screw hook 20a is fixed to the veneer 2b strongly, as shown in FIG. 9.

THIRD EXAMPLE OF USAGE

Figure 13:
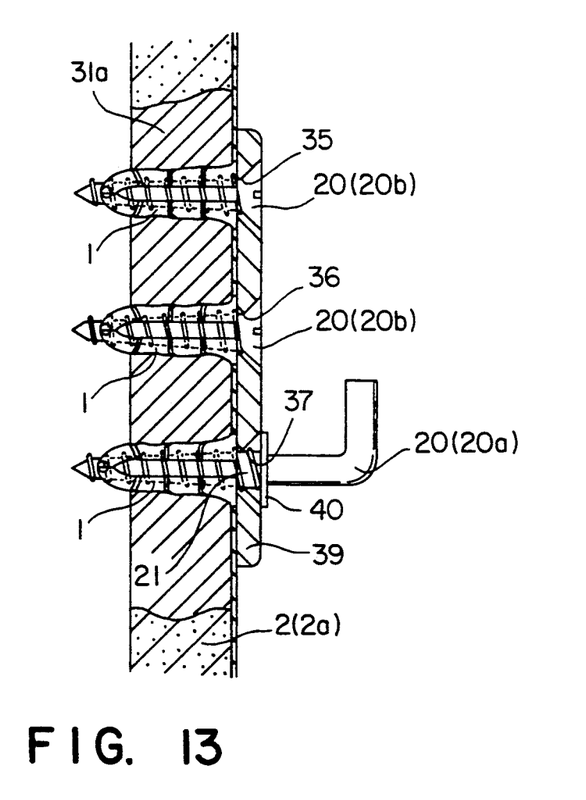
FIG. 13 is a sectional view showing fixing of a plate by utilizing the nail sustainers for increasing anti-hang load against a plaster board.
Figure 14:
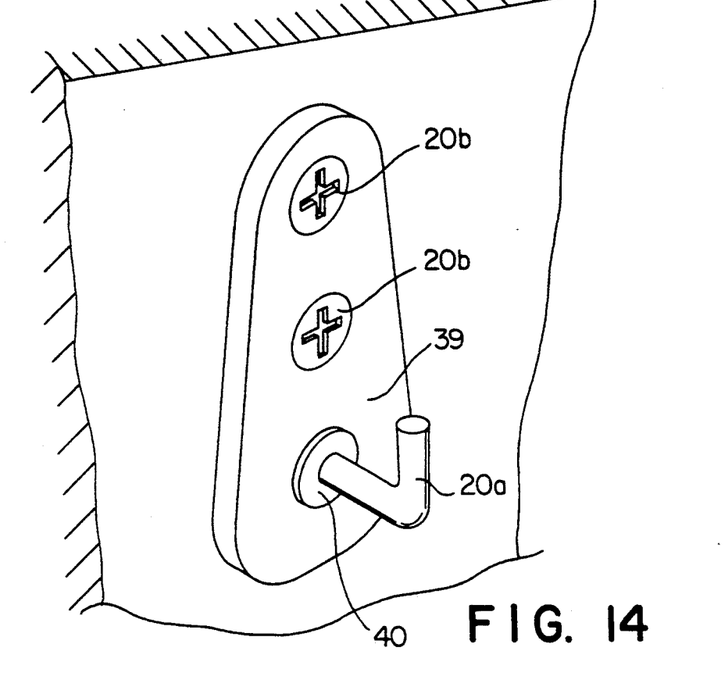
FIG. 14 is a perspective view showing the plate fixed to the plaster board.

FIGS. 13 and 14 show an example wherein a plate 39 having three screw holes 35, 36 and 37 for increasing anti-hanging load, is fixed to a board 2 for instance as a plaster board 2a.

The plate 39 is fixed by means of fixing screw nails 20b (nail 20) via the nail sustainers 1 by using the two upper screw holes 35 and 36 and 37. The screwed portion 21 of the screw hook 20a is driven into the nail sustainer 1 through the lower most screw hole 37 and a flange 40 of the screw hook 20a presses the plate 39 so that the plate may be fixed also by means of the screw hook.

Thus, when the plate 39 is used different from the usage of a single screw hook, most of the hanging load acting on the screw hook may be supported by the upper fixing screw nails 20b via the plate 39 as a pulling resistance. Therefore, it may extremely increase an anti-hanging load to the board.

Figure 15:
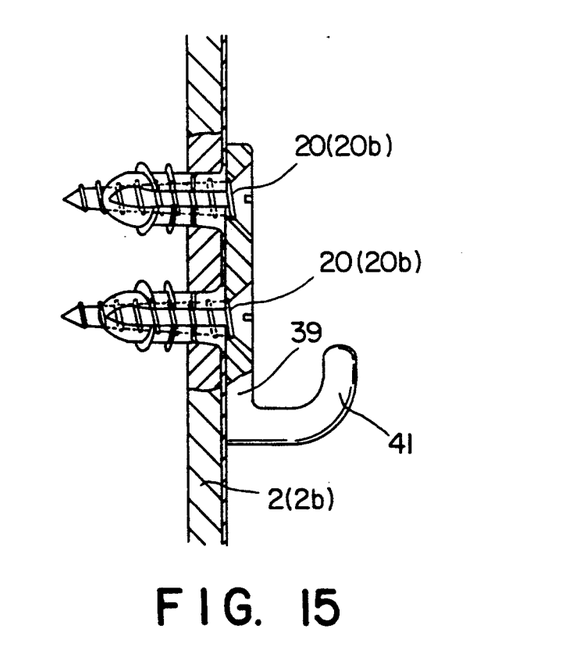
FIG. 15 is a sectional view showing fixing of a plate by utilizing the nail sustainers for increasing anti-hang load against a veneer.
Figure 16:
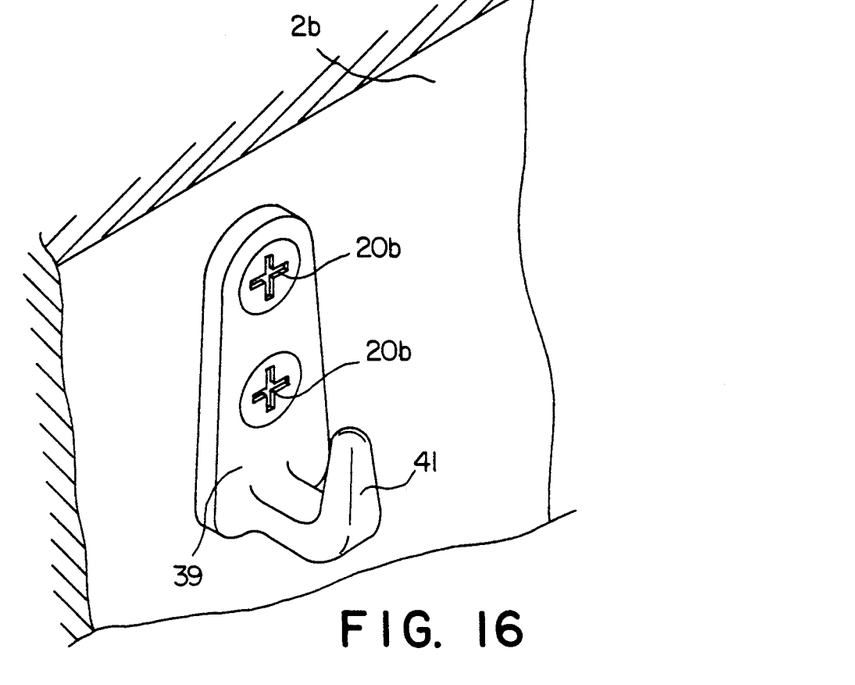
FIG. 16 is a perspective view of the plate having a screw hook.

Further, FIGS. 15 and 16 show a plate 39 provided with a hanger 41 integrally at the lower end thereof, which plate 39 is fixed to a board 2 for instance as a veneer 2b by using the same manner as mentioned above. Thus, it is considered in increasing anti-hanging load of the hanger 41, as in the case of FIGS. 13 and 14.

OTHER EXAMPLES OF USAGE

Figure 17:
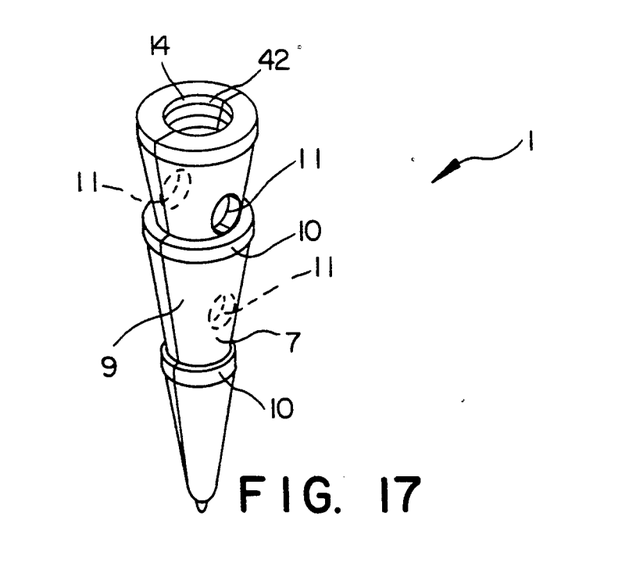
FIG. 17 is a perspective view of a nail sustainer of another embodiment according to this invention.
Figure 18:
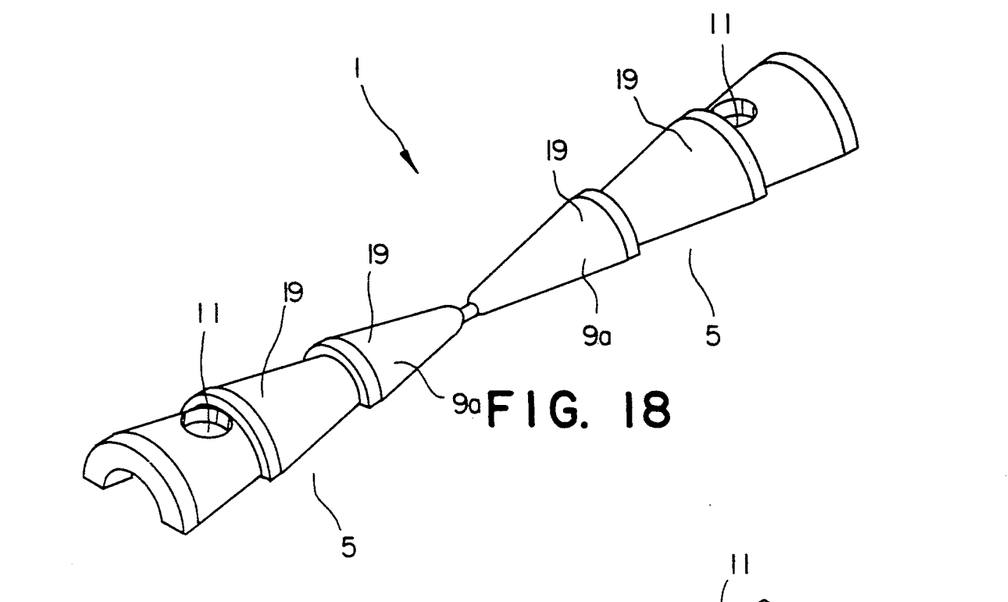
FIGS. 18 and 19 are perspective views each showing a pair of divided half portions of the nail sustainer as shown in FIG. 17, which half portions are connected to each other at the forward ends thereof to be bendable.
Figure 19:
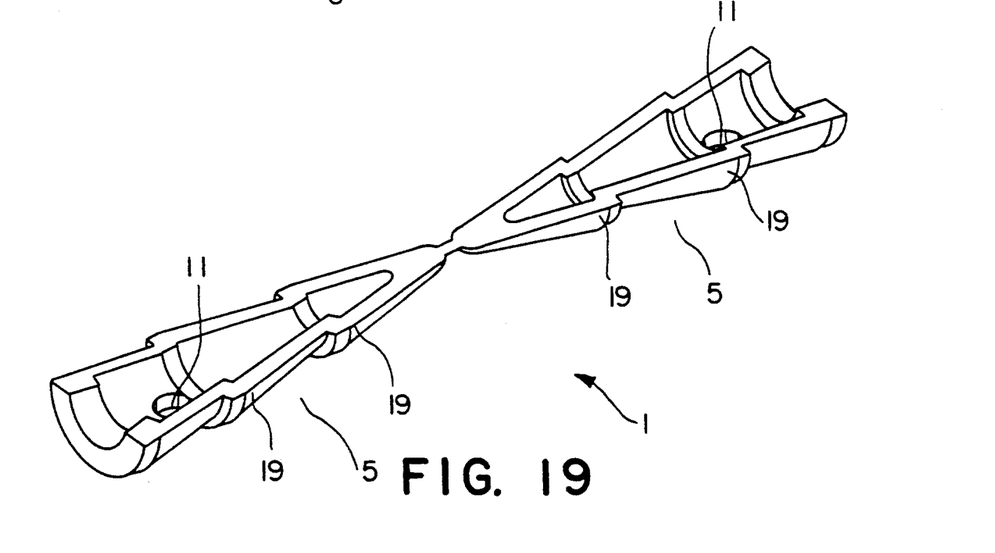

FIGS. 17 through 19 show an example of another embodiment of the nail sustainer according to the present invention.

The nail sustainer 1 is the same as the forementioned embodiments on the following points.

Namely, the nail sustainer 1 comprises a pair of divided half portions 5 and 5 which may form a nail inserting tube 7 by fitting same together, and the tube 7 becomes slender toward the forward end thereof. The divided half portions 5 and 5 are connected to each other at the forward end thereof to be bendable. Further, a flow opening 11 is formed with the divided half portions 5 and 5 at the base end portion thereof for flowing an adhesive agent.

However, in this embodiment, the flanges 19 of semicircle, which is formed to project from the peripheral portion 9a of each of the divided half portions 5 and 5, are constructed to appear the teeth of a saw in cross section. Therefore, the ring-like projections 10 projecting from the peripheral portion 9 of the tube 10 appear the teeth of a saw in cross section.

Where the nail sustainer 1 of this invention is made of metal such as aluminium, it is preferable to form a female screw portion 42 with the inner surface of the ring-like projecting portion 14, as shown in FIG. 17.

According to this invention, it is possible to construct the nail sustainer to form a integral tube without the bendable portion 6.

Further, where the nail sustainer of this invention is attached to a thick board such as a plaster board, a plurality of flow openings 11 may be arranged in a direction of the axis of the tube 7.

Now, function and operation of the nail sustainer of the present invention will be described as follows.

The operation cites such a case that a nail 20 as a screw hook 20a is driven into a board 2 such as a plaster board or a veneer which is weak in sustaining a nail.

After forming a hole 3 at a desired portion of the board 2, a nail sustainer 1 is inserted into the hole 3 by hammering so as to contact a base end peripheral edge portion 23 of a tube 7 with a base end inner edge portion 3a1 of the hole 3. Thereafter, a supplying nozzle 12 of a liquid adhesive agent is set to contact the base end portion of the tube 7 so as to close the opening end of the tube 7. The liquid adhesive agent is supplied into the tube 7 through a flow opening 29 of the supplying nozzle 12. A chamber 30 of the tube 7 is filled with the liquid adhesive agent and then it flows out through a flow opening 11 and penetrates a hole peripheral portion 31 of the board 2.

The description of penetration of the adhesive agent will be supplemented as follows.

The peripheral edge portion 17 of the ring-like projection 10 is in contact with the inner surface portion of the hole of the board 2 and further the base peripheral edge portion 23 of the tube 7 is in contact with the base end inner edge portion 3a1 of the hole 3. Therefore, a ring-like space 27a is formed on the outside of the periphery of the base end periperal surface portion of the tube 7 to surround the base end peripheral portion. Where a plurality of the ring-like projections 10 are provided, a ring-like space 27b is formed respectively between the ring-like projections 10 which are adjacent to each other. Therefore, the ring-like space 27a is, first, filled with the liquid adhesive agent flown out through the flow opening 11, and then the adhesive agent penetrates the peripheral portion 31 of the hole 31 evenly.

The inner surface portion 3a of the hole 3 formed with the board 2, is rough due to breaking of the inside wall of the hole at the time of drilling the hole. This rough surface functions to help easy pentration of the adhesive agent into the hole peripheral portion 31.

Thereafter, the screwed portion 21 of the screw hook 20a is driven into the chamber 30 of the tube 7. According to driving of the screw hook, the splitting portions 33 are gradually opened so that the remaining liquid adhesive agent in the chamber 30 may flow out between the splitting portions 33. In this case, the liquid adhesive agent flown out between the splitting portions 33, penetrates into the inside wall portion of the hole 11 by providing the spaces 27a and 27b which form ring-like spaces formed by the ring-like projections 10.

Then, the hole peripheral portion 31 may be improved to have a fine texture according to hardening of the adhesive agent and the ring-like projection 11 functions like an anchor so as to adhere the nail sustainer 1 to the improved portion. Further, the screwed portion 21 is driven into the chamber 32 of the tube while forming a screw groove 34 with the chamber inside surface portion 32 and then the screwed portion 21 and the tube may be integrated with each other. As the result, the screw hook 20a is fixed to the board 2 strongly.

As mentioned above, the nail 20 is strongly fixed to the board 2 by the texture improvement of the hole periphral portion 31 and unification of the nail sustainer 1 and the improved portion 31a, and further by unification of the nail sustainer 1 and the nail 20.

Therefore, even if the article to be hung on the screw hook is a frame or a blackboard which is relatively heavy or a hanging shelf which is remarkably heavy, it may be hung stably.

By the way, even if the peripheral portion of the hole 2 of the baord was improved to have a fine texture by means of an adhesive agent, it would be difficult to assure sufficient sustaining force where the screwed nail was the directly driven into the hole 2. Because, it is very difficult to improve the peripheral portion 31 of the hole 2 evenly and there is limitation to improve its texture to be fine.

Where the tapered hole portion 15 of the base end portion of the tube is formed, it is possible to close the tube opening by pressing the supplying nozzle 12 of the adhesive agent supplier to the tapered hole portion 15, and to prevent the supplying nozzle from further inserting into the tapered hole portion. Therefore, the liquid adhesive agent supplied from the supllying nozzle 12, may be smoothly flown out through the flow opening 11.

Where the ring-like projection 10 is formed to be a disc having flexibility, it becomes bent and deformed in such a state that the ring-like projection 10 fits the inner surface portion 3a of the hole 3 when the nail sustainer 1 is inserted into the hole 3 formed with the board 2. As the result, at the time of supply of the adhesive agent, it may prevent leakage of the liquid adhesive agent between the ring-like projection 10 and the hole inner surface portion 3a as minimum as possible. Further, where the screwed nail is driven into the tube, the ring-like projection may be bent and deformed smoothly in proportion to the expansion of the tube due to insertion of the screw nail.

What is claimed is:

1. A nail sustainer which is to be inserted into a hole (3) formed within a board which has poor sustaining force against a nail, comprising:

said nail sustainer includes a tapered tube means (7) including an outer base end and a forward smaller end, for insertion of a nail in said outer base end, said tapered tube means is tapered from said outer base end toward said forward smaller end and constructed to be inserted into the hole (3) of the board (2), and having a tapered chamber (30) which opens at the outer base end and tapers toward the forward smaller end, at least one radial flow opening (11) in said tapered tube means (7), said at least one flow opening faces an inner surface portion (3a) of the hole (3) and communicates with the chamber (30) of said tube means (7) for reception of an adhesive agent via said outer base end, axially aligned slits (33) in said tube means (7) that form split portions along substantially a whole length of the tube means (7) which divide said nail sustainer into equal parts, and at least one flexible ring-like radial projection (10) formed to project from a peripheral surface of said tube means (7) juxtaposed and forwardly of the at least one flow opening (11) to surround the periphery of said tube means (7), said ring-like projection (10) having an outer edge portion (17) which contacts an inner surface portion (3a) of the hole (3) to prevent a flow of the adhesive agent forwardly of the at least one flow opening along the outer periphery of the tapered tube means.

2. The nail sustainer as claimed in claim 1 wherein a ring-like inwardly directed projection (14) is provided along an inner wall of said outer base end of said tapered tube means (7), said ring-like inwardly directed projection (14) forming a tapered hole (15), the diameter of which is smaller toward the forward end of said tube means (7), so as to fit a periphery portion (13) of a supply nozzle (12) of an adhesive agent supplier.

3. The nail sustainer as claimed in claim 1 wherein a plurality of the flexible ring-like radial projections (10) are formed to project radially outwardly of said tube means (7) leaving a predetermined interval therebetween along the length of said tube means (7).

4. The nail sustainer as claimed in claim 1 wherein the flexible ring-like radial projection (10) is formed to be a disc having flexibility.

5. A nail sustainer as set forth in claim 3 which includes a plurality of radial flow openings related to each of said plurality of flexible ring-like radial projections.

6. A nail sustainer which is to be inserted into a hole (3) formed within a board which has poor sustaining force against a nail, in which:

said nail sustainer includes a tapered tube means (7) including an outer base end and a forward smaller end, for insertion of a nail into said outer base end comprising a pair of divided half portions (5) and (5) which are connected to each other at a forward end thereof, said tapered tube means tapers from said outer base end to said forward smaller end along its outer periphery and is provided with a tapered chamber (30) which tapers from the outer base end to the forward smaller end and is formed by fitting the divided half portions (5) and (5) to each other and which opens at the base end portion thereof, at least one radial flow opening (11) formed within a portion near the outer base end of the divided half portions (5) and (5) through which an adhesive agent will flow to surround the tapered tube means, and a semicircle-flange (19) formed respectively to project from a peripheral portion of each of the divided half portions (5) and (5), said semicircle-flange (19) being constructed to form a flexible ring-like radial projection (10) having a peripheral edge (17) that surrounds the periphery of said tube means (7), each of said semicircular flange (19) being juxtaposed and forward of said at least one radial flow opening (11) and which contacts an inner surface portion (3a) of the hole (3) with the peripheral edge (17), in such a state that the divided half portions (5) and (5) are fit to each other.

7. The nail sustainer as claimed in claim 6 which includes a plurality of the flexible ring-like radial projections (10) formed to project outwardly of a periphery of said tapered tube means (7) leaving a predetermined interval therebetween along the length of said tapered tube means (7).

8. A nail sustainer as set forth in claim 7 which includes a plurality of radial flow openings related to each of said plurality of flexible ring-like radial projections.

9. The nail sustainer as claimed in claim 6 wherein a plurality of the flexible flanges (19) of a semicircle shape are arranged along a length of the divided half portions (5) and (5), leaving a predetermined interval therebetween along the length of said tapered tube means.

10. The nail sustainer as claimed in claim 6 wherein a plurality of the flanges (19) are formed to be a semicircle disc having flexibility.

11. The nail sustainer as claimed in claim 6 wherein a semicircle projection (16) is provided on an inner surface of the outer base end of each of the divided half portions (5) to form a tapered hole (15) in the outer base inner surface of said tapered tube means (7) such that the divided half portions (5) and (5) are fitted together, said tapered hole (15) being formed to tightly fit a peripheral surface portion (13) of a supply nozzle (12) of an adhesive agent supplier.

12. The nail sustainer as claimed in claim 11 wherein a plurality of the flexible flanges (19) of a semicircle are arranged along a length of the divided half portions (5) and (5), leaving a predetermined interval therebetween along the length of said tapered tube means.

* * * * *